Patented Dec. 19, 1944

2,365,638

UNITED STATES PATENT OFFICE 2,365,638

SULPHONATION OF ORGANIC COMPOUNDS

George Felix Hennion, South Bend, Ind., assignor to E. I. du Pont de Nemours & Company, Wilmington, Del., a corporation of Delaware No Drawing. Application February 21, 1940, Serial No. 320,013

10 Claims. (Cl. 260—505)

This invention relates to the sulphonation of organic compounds and especially to improved processes wherein boron trifluoride is contained in the reaction medium, thereby facilitating the manufacture of the sulphonated product.

It is among the objects of the present invention to provide improved processes for sulphonating organic compounds of the aromatic and heterocyclic series. Another object of the invention is to provide processes of sulphonation in which boron trifluoride is used to assist and augment the reaction. Other objects of the invention will be apparent from the following disclosure.

The invention will be more fully set forth in the following more detailed description which includes examples that are given as illustrative embodiments of the invention and not as limitations thereof. Parts are expressed in parts by weight unless otherwise noted.

Example 1—Sulphonation of phenol

One mole equivalent (94.0 parts) of phenol was mixed with 117.6 parts (1.2 moles) of 100% sulphuric acid in a closed steel bomb. Boron fluoride was passed in until 11 parts (0.16 mole) had been adsorbed. The bomb and contents were heated for 1 hour at 100° C. in a boiling water bath. The charge was then boiled with about 750 parts of saturated salt solution (about 20%). The clear solution was filtered and a product was allowed to crystallize out. After crystallization the product was filtered and air-dried. The process yielded 162 parts of phenol sodium sulphonate which is equivalent to a yield of 82.6%. The product contained 13.48% organic sulphur and 0.12% inorganic sulphur. The product was converted to the corresponding para-methoxy-sulphonamide which had a melting point of 103°–105° C. which proved it to be essentially para-phenol sodium sulphonate.

Example 2—Sulphonation of benzene

Into a three-necked container were placed 78 parts (1.0 mole) of benzene and 104 parts (1.0 mole) of 94% sulphuric acid. The container was equipped with a mechanical stirrer, reflux condenser and inlet tube for boron fluoride. Gaseous boron fluoride was passed in, with vigorous stirring, for ninety minutes at which time 66 parts had been absorbed. Additional heating over boiling water for thirty minutes caused a 16 parts loss in weight. The sulphonated product was remarkably clear, homogeneous and only mildly yellow in color. Upon diluting the product with water and distilling with steam, only 1.1 parts of unsulphonated benzene was recovered, indicating that sulphonation was about 98% complete. The residual solution was limed, boiled and filtered with suction. The filter cake was leached three additional times with 500 part portions of hot water and the four solutions evaporated to dryness separately, the precipitates dried at 100°–120° C. and analyzed for calcium (calculated 11.3% for anhydrous and 10.75% for monohydrate). The analyses were as follows:

| Leach No. | Solute | Ca |
|---|---|---|
|  | Parts | Per cent |
| 1 | 137.0 | 10.46 |
| 2 | 22.5 | 12.77 |
| 3 | 8.0 | 15.24 |
| 4 | 3.5 | 17.94 |

A control experiment was performed, omitting the boron fluoride, and showed only 42% sulphonation.

Example 3—Sulphonation of toluene 92 parts (1.0 mole) of toluene was sulphonated with 104 parts (1.0 mole) of 94% sulphuric acid as described in Example 2. The steam distillation indicated 98% reaction. A sample of calcium salt was converted to the phenyl ester which melted at 94°–95° C. The product was, therefore, chiefly the para-sulphonic acid, the phenyl ester of which melts at 95°–96° C.

Example 4—Sulphonation of naphthalene (cold)

While maintaining the temperature between about 20° and about 30° C., 108 parts of boron fluoride were passed into 1.50 mole parts of naphthalene and 1.52 mole parts of 94% sulphuric acid. This required eight hours and stirring was continued for an equal period. The product was diluted with water, neutralized with soda ash and allowed to crystallize. The first crop of crystals weighed 263 parts and was predominantly the alpha-sulphonate since the amide made from this compound melted at 145°–147° C. as compared with the melting point of 150° C. as reported in literature. The second crop of crystals weighed 99.5 parts. This was recrystallized and gave 62 parts of sodium naphthalene sulphonate which was also found to be substantially the alpha isomer.

Similar results were obtained at sulphonating temperatures as low as about 0° C.

Example 5—Sulphonation of naphthalene (hot)

The process described in Example 4 was repeated at 160°–165° C. 48 parts of boron fluoride were absorbed in ninety minutes. Dilution with water gave 16 parts of b,b'-dinaphthyl sulphone, M. P. 174°–175° C., as compared with the melting point of 177° C. as reported in literature. The acid which was recovered as the sodium salt weighed 323.5 parts as compared with a possible theoretical yield of 345 parts. The sulphonamide made from the product melted at 212°–213° C. which is the accepted melting point of the beta isomer.

Example 6—Disulphonation of carbazole 42.5 parts (0.25 mole 98% grade) of carbazole were treated with 54 parts (0.52 mole) 94% sulphuric acid and 29 parts of boron fluoride at 100° C. The product was taken up in water, neutralized with slaked barium oxide, filtered and the filtrate was evaporated to crystallization. The deposit weighed 32 parts and contained 30.9% barium. The mother liquor was evaporated to crystallization and gave a second quantity of crystals which weighed 82.5 parts and contained 32.4% barium. The calculated barium content of the disulphonate monohydrate is 28.5%.

Example 7—Disulphonation of diphenyl

Disulphonation of 38.5 parts (0.25 mole) of diphenyl with 53 parts (0.51 mole) of 94% sulphuric acid and 25.5 parts of boron fluoride gave a mixture containing both the mono and disulphonic acids. These were separated effectively by the procedure of Latschinou (Ref. Latschinou, Ber., 6, 194 (1873)) and then converted to their potassium salts. The products were identified through the derivatives recommended by Gabriel and Deutsch. (Ref. Gabriel and Deutsch, Ber., 13, 386 (1880)).

Example 8—Sulphonation of b-naphthylamine 36 parts of beta-naphthylamine were dissolved in hot dilute hydrochloric acid and treated with an excess of sodium sulphate solution to precipitate the amine sulphate. The latter was filtered, washed and dried for one hour with heating up to 100° C. The dried, powdered b-naphthylamine sulphate (48 parts, 0.2 mole) was sifted into 125 parts (1.3 moles) of well stirred 100% sulphuric acid held at 50°–55° C. The mixture was a pasty semi-solid. Boron fluoride was then passed into the mixture with stirring whilst maintaining the temperature at 50°–55° C. The mixture liquefied as the $BF_3$ was absorbed. After thirty minutes the product began to increase in viscosity and rather suddenly set to a mass of small crystals. The temperature was then raised to 100° C. and heating continued for an additional thirty minutes. The product again liquefied and more boron trifluoride was added. The crude product was then cooled and treated with 300 cc. of water. The mixture was made into a thin paste by stirring and was then chilled overnight. The sulphonic acids were filtered off and dried. The filtrate contained only a trace of sulphonic acid as shown by a nitrite value of only .045% and no coupling value. The product was a mixture of mono and disulphonic acids as well as a mixture of isomers.

Similar results were obtained by using alpha naphthylamine in the above procedure instead of beta naphthylamine.

Example 9—Disulphonation of naphthalene 128 parts (1.0 mole) of powdered naphthalene were treated with 205.8 parts (2.1 moles) of 100% sulphuric acid and agitated to form a paste. 63 parts of boron fluoride were passed into the reaction mass with liberation of considerable heat. The charge was heated at 100° C. for ninety minutes. The product contained 17.29% organic sulphur and no inorganic sulphur. The calculated organic sulphur content for the disulphonated naphthalene is 22.2%.

Example 10—Sulphonation of 1,4-di-(p-toluidino)-anthraquinone

Fifty parts of 1,4-di-(p-toluidino)-anthraquinone were added to 250 g. of 100% sulphuric acid whilst maintaining the temperature below 25° C. The mixture was then cooled to 0°–5° C. and 136 parts (2.0 moles) of boron fluoride were passed into the mass. There was an increase in weight of 37 parts. The charge was drowned in four thousand parts of water whilst keeping the temperature below 25° C. The sulphonic acid was "salted out" with 100 parts of sodium chloride and stirred until precipitation was complete. The product was filtered, washed with two thousand parts of 5% brine solution, and dried at 50°–55° C. The product contained 5.81% sulphur (calculated sulphur content for the monosulphonic acid is 6.43%). A good yield was obtained.

Example 11—Sulphonation of naphthalene and recovery of $BF_3$

During a period of ninety minutes, 58 parts of boron fluoride were passed into a mixture of 192 parts (1.5 moles) of naphthalene and 158 parts (1.51 moles) of 94% sulphuric acid whilst the temperature was maintained at 160°–165° C. Five parts of water were added and the product was vacuum distilled. There was obtained 80.5 parts of distillate, B. P. 83° C. at 23 mm. which was $BF_3.2H_2O$. The recovery was thus 90% of the theoretical. The residue was poured into water, yielding 21.5 parts of the insoluble sulphone which was treated in the usual way to convert it into the free sulphonic acid form.

In general the presence of boron trifluoride causes a more active sulphonation of all compounds of the aromatic and heterocyclic series. At any given temperature the sulphonation in the presence of boron trifluoride is in general more complete and more rapid than when the catalyst is not present. The boron trifluoride appears to have an effect on the sulphonation which is not like the effect of a dehydrating agent since the substitution of $P_2O_5$ for boron trifluoride in similar sulphonations does not give as good yields. The presence of boron trifluoride generally permits the use of lower temperatures for a given sulphonation, thereby providing the means to vary the ratio of isomers. The presence of the catalyst is also beneficial in that for a given kind of sulphonation a large excess of sulphuric acid is generally unnecessary thus enabling a yield of the sulphonation product in a purer form and without the presence of undesirable by-products. The activating effect of boron trifluoride is also manifested in that substantially stoichiometric proportions of the aromatic compound and sulphuric acid can be used when boron trifluoride is present whereas an excess of one of the compounds is generally necessary when the catalyst is not present. Another advantage of the catalyst resides in the fact that for a given sulphonation the yield is improved. Boron trifluoride can be easily separated from the desired sulphonation products. The boron trifluoride which is separated from the sulphonated product can also be easily recovered.

It is desirable to have present in the reaction medium during sulphonation at least .05 mole of boron trifluoride per mole of the organic compound which is being sulphonated but any excess of boron trifluoride above this amount can be used. Boron trifluoride has a beneficial effect at all temperatures which can be used for direct sulphonation of aromatic and heterocyclic organic compounds in liquid and semi-liquid phase. For a given sulphonation the necessary temperature to complete the reaction is lower in general than that which is needed to produce good yields of satisfactory product when boron trifluoride is not present. In general the sulphonation at a given temperature is more complete and more rapid when boron trifluoride is present in the reaction mixture. Boron trifluoride may be introduced into the reaction mixture in an anhydrous or an incompletely hydrated form. When high temperatures or other circumstances cause undue losses of reaction products or of boron trifluoride, a closed reaction system can be used and pressures at or above atmospheric pressure can be used without deleteriously affecting the action of boron trifluoride. Solvents which are referred to in the specification and claims as inert solvents are those which do not enter in the reaction or combine with the sulphonated products. Such inert solvents can be present in the reaction medium. Useful inert solvents are, for example, tetrachlor ethane, nitro benzene and ethylene dichloride.

The beneficial effect of boron trifluoride is present with initial reactants which are hydrous as well as with those which are anhydrous; and the sulphonation of all compounds of the aromatic, as well as those of the heterocyclic series, such as pyridine, xanthene, thioxanthene and the like, are similarly effected. Dehydrating agents may be present or absent. Although it is often convenient first to form a mixture of boron trifluoride and the material to be sulphonated, and to add this mixture to the sulphonating agent, any manner of forming a mixture comprising these components can be used. The process is especially valuable for sulphonating compounds of the benzene and naphthalene series, particularly benzene, naphthalene and naphthylamine.

From the foregoing disclosure it will be recognized that the invention is susceptible of modification without departing from the spirit and scope thereof and it is to be understood that the invention is not restricted to the specific illustrations thereof herein set forth.

I claim:

1. The process which comprises making a sulphonating mixture comprising sulphuric acid, boron trifluoride and an organic compound of the group consisting of compounds of the aromatic and heterocyclic series; and maintaining the reaction mixture at sulphonating temperatures until the organic compound is sulphonated.

2. The process which comprises making a sulphonating mixture comprising sulphuric acid, boron trifluoride and an organic compound of the group consisting of compounds of the aromatic and heterocyclic series; and maintaining the reaction mixture at sulphonating temperatures until the organic compound is sulphonated, said boron trifluoride being present in amount which is equivalent to at least .05 mole of boron trifluoride per mole of the organic compound being sulphonated.

3. In the process of making a sulphonated organic compound of the heterocyclic series by the action of sulphuric acid on a compound of said series, the step which comprises adding boron trifluoride to the reaction mixture.

4. In the process of making a sulphonated organic compound of the aromatic series by the action of sulphuric acid on a compound of said series, the step which comprises adding boron trifluoride to the reaction mixture.

5. In the process of making a sulphonated organic compound from the group consisting of the benzene and naphthalene series by the action of sulphuric acid on a compound of said series, the step which comprises adding boron trifluoride to the reaction mixture.

6. In the process of making a sulphonated organic compound of the benzene series by the action of sulphuric acid on a compound of said series, the step which comprises adding to the reaction mixture at least 0.05 mole of boron trifluoride per mole of the compound being sulphonated.

7. In the process of mono-sulphonating benzene, the steps which comprise making a mixture of benzene and sulphuric acid in about equimolecular proportions, adding boron trifluoride to the reaction mixture, heating to about 100° C. until the benzene is mono-sulphonated, said boron trifluoride being present in amount between about .05 mole and about 1 mole per mole of benzene.

8. In the process of sulphonating naphthalene, the steps which comprise making a mixture of naphthalene and sufficient sulphuric acid to mono-sulphonate the naphthalene, adding boron trifluoride and maintaining the temperature between about 0° and about 165° C. until the naphthalene is sulphonated, said boron trifluoride being present during sulphonation from an amount equivalent to at least .05 mole.

9. In the process of sulphonating naphthylamine, the steps which comprise forming a reaction medium comprising sulphuric acid and the sulphate of the naphthylamine, passing boron trifluoride into the reaction mixture during sulphonation and heating the mixture.

10. The process which comprises sulphonating an organic compound of the aromatic series with sulphuric acid in the presence of boron trifluoride.

GEORGE FELIX HENNION.